United States Patent
Saleem et al.

(10) Patent No.: US 11,958,036 B1
(45) Date of Patent: *Apr. 16, 2024

(54) POLYETHYLENE-BASED POROUS OIL SORBENT WITH SWELLABLE POCKETS

(71) Applicant: King Faisal University, Al-ahsa (SA)

(72) Inventors: Junaid Saleem, Al-Ahsa (SA); Safdar Hossain Sk, Al-Ahsa (SA); Zubair Khalid Baig Moghal, Al-Ahsa (SA); Gordon McKay, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,387

(22) Filed: Sep. 1, 2023

(51) Int. Cl.
| | |
|---|---|
| B01J 20/26 | (2006.01) |
| B01J 20/28 | (2006.01) |
| B01J 20/30 | (2006.01) |
| C02F 1/28 | (2023.01) |
| C02F 1/40 | (2023.01) |

(Continued)

(52) U.S. Cl.
CPC ....... *B01J 20/261* (2013.01); *B01J 20/28004* (2013.01); *B01J 20/28033* (2013.01); *B01J 20/3007* (2013.01); *B01J 20/3064* (2013.01); *B01J 20/3071* (2013.01); *C02F 1/285* (2013.01); *C02F 1/40* (2013.01); *C08J 5/18* (2013.01); *C08J 9/26* (2013.01); *C02F 2101/32* (2013.01); *C02F 2103/007* (2013.01); *C02F 2303/16* (2013.01); *C08J 2201/0446* (2013.01);

(Continued)

(58) Field of Classification Search
None
See application file for complete search history.

(56) References Cited

U.S. PATENT DOCUMENTS

| | | | | |
|---|---|---|---|---|
| 5,834,385 A | * | 11/1998 | Blaney | B32B 5/022 442/385 |
| 8,465,565 B2 | * | 6/2013 | Calis | B01D 46/543 96/12 |

(Continued)

OTHER PUBLICATIONS

Saleem et al. (Waste Management, 2015, 44, 34-38). (Year: 2015).*

(Continued)

*Primary Examiner* — Clare M Perrin
(74) *Attorney, Agent, or Firm* — Nath, Goldberg & Meyer; Richard C. Litman (57) ABSTRACT

Freestanding porous polyethylene thin film, and a method for preparing a freestanding porous polyethylene thin film. The method includes dissolving polyethylene in an organic solvent to form a solution under reflux conditions; adding a swellable pocket forming agent to the solution and mixing the solution until the swellable pocket forming agent is well-dispersed therein; applying the well-dispersed solution onto a solid substrate through spin coating to form a thin film on the solid substrate; peeling the thin film off the solid substrate; and extracting the swellable pocket forming agent from the peeled thin film by washing the peeled thin film in water, thereby obtaining a freestanding porous polyethylene thin film with swellable pockets, macro-voids, and micropores. The freestanding porous polyethylene thin film can be used as an oil sorbent. The freestanding porous polyethylene thin film has about 500 to about 800 swellable cavities per $cm^2$.

18 Claims, 6 Drawing Sheets

(51) Int. Cl.
*C08J 5/18* (2006.01)
*C08J 9/26* (2006.01)
*C02F 101/32* (2006.01)
*C02F 103/00* (2006.01)

(52) U.S. Cl.
CPC ...... *C08J 2205/044* (2013.01); *C08J 2323/06* (2013.01)

(56) References Cited

U.S. PATENT DOCUMENTS

10,340,492 B2* 7/2019 Inatomi ................. H01M 4/505
2022/0089822 A1* 3/2022 Yamada ................ B29C 55/005

OTHER PUBLICATIONS

David et al. (Optical Materials Express, 2022, 12, 2168). (Year: 2022).*
Filippova et al. (IOP Conf. Series: Materials Science and Engineering, 2016, 125, 012020). (Year: 2016).*
Elyashevich et al. (Physics of the Solid State, 2012, 54, 1907-1916) (Year: 2012).*
Junaid Saleem, et al., "Up-cycling plastic waste into swellable super-sorbents", Journal of Hazardous Materials, vol. 453, pp. 1-14, First available online Apr. 5, 2023. #.
Junaid Saleem, et al., "Reusable Macroporous Oil Sorbent Films from Plastic Wastes", Polymers 2022, 14(22), 4867, pp. 1-7, First available online Nov. 11, 2022. #.
Junaid Saleem, et al., "Development of Polymeric Aerogel using Plastic Wastes for Oil Cleanup from Wastewater", Proceedings of the World Congress on Engineering and Computer Science 2018, vol. II, First available online Dec. 21, 2018. #.
Junaid Saleem, et al., "Free-Standing Porous and Nonporous Polyethylene Thin Films Using Spin Coating: An Alternate to the Extrusion-Stretching Process", ACS Applied Polymer Materials 2023 5(3), First available online Feb. 23, 2023. #.
Olga V. Arzhakova, et al. "Mesoporous Membrane Materials Based on Ultra-High-Molecular-Weight Polyethylene: From Synthesis to Applied Aspects", Membranes 2021, 11(11), 834, First available online Oct. 28, 2021.

* cited by examiner

POLYETHYLENE-BASED POROUS OIL SORBENT WITH SWELLABLE POCKETS

FIELD AND BACKGROUND

The disclosure of the present application relates to a freestanding porous polyethylene thin film, and particularly to a method for preparing a freestanding porous polyethylene thin film.

DESCRIPTION OF THE PRIOR ART

Oil spills on water surfaces and shorelines have always been a source of water pollution. One of the remedies to oil spills is the utilization of oil sorbents. The sorption mechanism comprises the wetting tendency of the sorbent, capillary action created through pores and macro-voids that attracts oil, capillary action inside the micropores, cohesion between the oil molecules at the surface of the sorbent and the oil molecules inside micropores and macro-voids, adhesion of the oil molecules on the surface of the sorbent, and the available surface volume/area of the sorbent. An effective sorbent provides high oil uptake and retention values, high selectivity, super-fast uptake kinetics, and sufficient mechanical strength to ensure practical application under different conditions.

Commercial sorbent pads and sheets can have non-woven fabric to form a thin film of 10 μm to 30 μm. These films can be stacked to make a thick sorbent pad as in the case of 3M-HP-255, 3M-156, Chemtex-BP-9W, and Alsorb. They can be made by spinning polypropylene or polyethylene using heat and air into long fluffy fibers or threads, followed by pressing the fibers together between hot rollers to get a flexible solid fabric thin film. The minimum thickness of these pads tends to be 5 mm, which enforces a limit on the quantity of such pads which may be kept in a given space.

Further, for thin water-borne oil films, these pads and sheets at times pick up undesirable water as a portion of these materials float below the oil surface, i.e., in the water. Accordingy, there is a need to prepare thin films that can effectively remove oil and can be stored in a smaller space compared to thick pads and sheets.

Several thin film sorbents with micropores have been made using polyethylene and/or polypropylene. These polyolefin microporous thin films can be made either by a wet extrusion or a dry extrusion process. The wet process often comprises extruding polyolefin with a diluent at a high temperature to form a single pseudo-gel-like single phase, hot-pressing the pseudo-gel to produce a uniform sheet, uniaxially or biaxially stretching the sheet, and extracting the diluent portion using a solvent to create pores. Extraction of the diluent can be before or after the stretching step as per the final requirements of the microporous thin film. The dry process often comprises mixing a polyolefin with a pore-forming agent such as an inorganic filler or another polymer to produce a dispersion, hot-pressing the dispersion to produce a uniform sheet, stretching the sheet uniaxially or biaxially, and subjecting the resultant sheet to aqueous or nonaqueous solvent capable of dissolving pore-forming agent to create pores.

However, there tend to be two intrinsic issues with films formed by these methods. First, the thickness of the freestanding single thin film is on average 10 μm with a microporous structure; hence, the oil uptake capacity is limited. Secondly, the preparation method is energy-intensive, laborious, expensive, and involves a series of steps.

Thus, there is a need to prepare an oil sorbent with swellable pockets that get swelled in contact with oil to achieve extremely high oil uptake capacity without increasing the thickness of the sorbent.

SUMMARY

The present disclosure is directed towards a method of preparing a freestanding porous polyethylene thin film with swellable pockets, macro-voids, and micropores to maximize diffusion, sorption, and retention mechanism for oil and organics sorption or use as a material storage, as well as the resultant thin films made by the method. These thin films with swellable pockets can be kept in a compressed form under normal conditions and they can be mechanically squeezed after oil sorption to recover the oil.

Further, the present disclosure target the preparation of thin films with swellable pockets using polyethylene, either virgin or recycled, that can provide extremely high oil-uptake capacity; a combination of pores, macro-voids, and swellable pockets to maximize diffusion, sorption, and retention mechanism; and sufficient mechanical strength to be used in all types of practical applications.

Accordingly, one embodiment of the present subject matter is directed to a method for preparing a freestanding porous polyethylene thin film comprising: dissolving polyethylene in an organic solvent to form a solution under reflux conditions; adding a swellable pocket forming agent to the solution and mixing the solution until the swellable pocket forming agent is well-dispersed therein, thereby forming a well-dispersed solution; placing a solid substrate onto a spin coater chuck; applying the well-dispersed solution onto the solid substrate through spin coating to form a thin film on the solid substrate; collecting excess materials of the polyethylene and the organic solvent in a spin coated drain connected to a receiver; removing the solid substrate with the thin film formed thereon from the spin coater chuck; subjecting the formed thin film to post-heat; peeling the thin film off the solid substrate to obtain a peeled thin film; and extracting the swellable pocket forming agent from the peeled thin film by washing the peeled thin film in water, thereby obtaining a freestanding porous polyethylene thin film with swellable pockets, macro-voids, and micropores.

In an embodiment, the organic solvent can be selected from the group consisting of p-xylene and an isomeric mixture of xylenes.

In another embodiment, the dissolving polyethylene step can comprise dissolving the polyethylene and the organic solvent in a round-bottomed flask and connecting the round-bottomed flask to a reflux condenser to avoid loss of the organic solvent.

In a further embodiment, the swellable pocket forming agent can be selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the swellable pocket forming agent can range from about 3 μm to about 200 μm.

In an embodiment, the solid substrate can be selected from the group consisting of glass and metal.

In some embodiments, the freestanding porous polyethylene thin film can be made of a virgin or recycled material selected from the group consisting of LDPE (low-density polyethylene), LLDPE (linear low-density polyethylene), HDPE (high-density polyethylene), UHMWPE (ultrahigh molecular weight polyethylene), and a combination thereof.

In some embodiments, the formed thin film can be subject to the post-heat for about 5 seconds to about 25 minutes and can be conducted at a temperature of about 25° C. to about 150° C.

In some embodiments, the swellable pocket forming agent can be added to the solution in a ratio of the polyethylene to the cavity forming agent of about 1:0 w/w % to about 1:2 w/w %.

In some embodiments, the macro-voids can be formed by conducting the spin coating at a speed above about 600 rpm to obtain macro-void dimensions of between about 10 μm and about 200 μm.

In some embodiments, the freestanding porous polyethylene thin film can be self-supporting, free of a support or a substrate or a wall surface.

In some embodiments, the freestanding porous polyethylene thin film can be laminated with a layer of superhydrophobic coating using a chemical vaporization technique or a physical vaporization technique to make the freestanding porous polyethylene thin film superoleophilic or superhydrophobic.

In some embodiments, the freestanding porous polyethylene thin film can be laminated with a nonwoven thin polypropylene fabric made up of fibers to provide support and further enhance sorption capacity of the freestanding porous polyethylene thin film.

In some embodiments, the freestanding porous polyethylene thin film can be used as an oil sorbent.

In other embodiments, the polyethylene can be UHMWPE (ultrahigh molecular weight polyethylene) at 15 wt. % of the solution.

In further embodiments, the present subject matter relates to a freestanding porous polyethylene thin film prepared according to the method as described herein.

In an embodiment, the freestanding porous polyethylene thin film can have about 500 to about 800 swellable pockets per $cm^2$, wherein each of the swellable pockets can swell twenty to thirty times a thickness of the freestanding porous polyethylene thin film when in contact with oil.

In another embodiment, the freestanding porous polyethylene thin film can have a thickness of about 2 μm to about 100 μm, a tensile strength of about 3 MPa to about 60 MPa, and a porosity ranging from about 1% to about 75%.

In a further embodiment, the swellable pockets, the macro-voids, and micropores can have dimensions of about 3 μm to about 200 μm, about 10 μm to about 200 μm, and about 0.5 μm to about 10 μm, respectively.

In an embodiment, the freestanding porous polyethylene thin film can have an oil uptake capacity of about 70 g/g to about 160 g/g measured immediately after taking out the freestanding porous polyethylene thin film from an oil bath.

In a further embodiment, the present subject matter relates to a method for mitigating oil spills from water, the method comprising: providing a supply of the freestanding porous polyethylene thin film of claim 15 as a roll, said freestanding porous polyethylene thin film having a density less than water; deploying a certain length of the freestanding porous polyethylene thin film onto an area to be protected from oil; removing the deployed freestanding porous polyethylene thin film, now containing oil; and mechanically squeezing the freestanding porous polyethylene thin film-containing oil to recover at least 98% of the oil contained therewith, permitting the freestanding porous polyethylene thin film to be reused in the method for mitigating oil spills with about 98% oil sorption efficiency.

These and other features of the present subject matter will become readily apparent upon further review of the following specification.

BRIEF DESCRIPTION OF DRAWINGS

In FIG. 1A, the porous thin film shows a swellable pocket from the top surface. In FIG. 1B, the porous thin film and the sponge-like swellable pocket show micropores.

In FIG. 2A, a porous thin film with a swellable pocket from the top surface is shown. In FIG. 2B, the porous thin film and the swellable pocket with a microporous structure is shown.

Similar reference characters denote corresponding features consistently throughout the attached drawings.

DETAILED DESCRIPTION

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The term "PE (polyethylene)" as used herein is intended to include LDPE (low-density polyethylene), LLDPE (linear low-density polyethylene), HDPE (high-density polyethylene), and UHMWPE (ultrahigh molecular weight polyethylene).

The term "free-standing thin film" refers to a film that does not adhere to a support such as a substrate or a wall surface to maintain the film structure. It should be used independently without the support of any substrate or without forming a complex with the support. It should not be collapsed when used as a free-standing thin film.

The term "porous" as used herein refers to a plurality of pores provided in a thin film. Further, the pores may or may not penetrate through the thin film. A porous thin film may have penetrating pores and non-penetrating pores.

In one embodiment, the present subject matter relates to a method for preparing a freestanding porous polyethylene thin film comprising: dissolving polyethylene in an organic solvent to form a solution under reflux conditions; adding a swellable pocket forming agent to the solution and mixing the solution until the swellable pocket forming agent is well-dispersed therein, thereby forming a well-dispersed solution; placing a solid substrate onto a spin coater chuck; applying the well-dispersed solution onto the solid substrate through spin coating to form a thin film on the solid substrate; collecting excess materials of the polyethylene and the organic solvent in a spin coated drain connected to a receiver; removing the solid substrate with the thin film formed thereon from the spin coater chuck; subjecting the formed thin film to post-heat; peeling the thin film off the solid substrate to obtain a peeled thin film; and extracting the swellable pocket forming agent from the peeled thin film by washing the peeled thin film in water, thereby obtaining a freestanding porous polyethylene thin film with swellable pockets, macro-voids, and micropores.

In an embodiment, the organic solvent can be selected from the group consisting of p-xylene and an isomeric mixture of xylenes.

In another embodiment, the dissolving polyethylene step comprises dissolving the polyethylene and the organic solvent in a round-bottomed flask and connecting the round-bottomed flask to a reflux condenser to avoid loss of the organic solvent.

In a further embodiment, the swellable pocket forming agent can be selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the swellable pocket forming agent can range from about 3 μm to about 200 μm.

In an embodiment, the solid substrate can be selected from the group consisting of glass and metal.

In some embodiments, the freestanding porous polyethylene thin film can be made of a virgin or recycled material selected from the group consisting of LDPE (low-density polyethylene), LLDPE (linear low-density polyethylene), HDPE (high-density polyethylene), UHMWPE (ultrahigh molecular weight polyethylene), and a combination thereof.

In some embodiments, the formed thin film is subjected to the post-heat for about 5 seconds to about 25 minutes and which is conducted at a temperature of about 25° C. to about 150° C.

In some embodiments, the swellable pocket forming agent can be added to the solution in a ratio of the polyethylene to the cavity forming agent of about 1:0 w/w % to about 1:2 w/w %.

In some embodiments, the macro-voids can be formed by conducting the spin coating at a speed above about 600 rpm to obtain macro-void dimensions of between about 10 μm and about 200 μm.

In some embodiments, the freestanding porous polyethylene thin film can be self-supporting, free of a support or a substrate or a wall surface.

In some embodiments, the freestanding porous polyethylene thin film can be laminated with a layer of superhydrophobic coating using a chemical vaporization technique or a physical vaporization technique to make the freestanding porous polyethylene thin film superoleophilic or superhydrophobic.

In some embodiments, the freestanding porous polyethylene thin film can be laminated with a nonwoven thin polypropylene fabric made up of fibers to provide support and further enhance sorption capacity of the freestanding porous polyethylene thin film.

In some embodiments, the freestanding porous polyethylene thin film can be used as an oil sorbent.

In other embodiments, the polyethylene can be UHMWPE (ultrahigh molecular weight polyethylene) at about 15 wt. % of the solution.

Figure 1A:
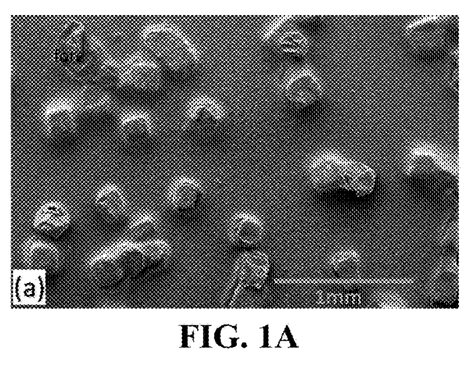
FIGS. 1A-1B depict SEM images of polyethylene thin films with swellable pockets.
Figure 1B:
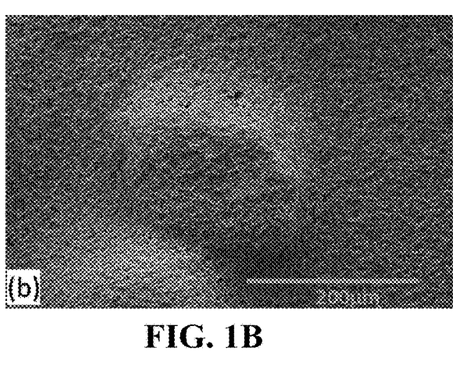

In FIGS. 1A-1B, the porous thin film made of polyethylene with prefilled swellable pockets was prepared through spin coating. The peeled layer was washed in water to achieve empty swellable pockets. The porous thin film and the swellable pockets also showed micropores. The thickness of the thin film can range from about 2 μm to about 100 μm or, in certain embodiments, from about 2 μm to about 20 μm. The porous thin film can have an area ranging from about 1 cm² to about 1296 cm², or more, and a diameter of the film ranging from about 1 cm to about 36 cm, or more. The dimension of the swellable pocket forming agent can range from about 0.1 μm to about 200 μm or, in certain embodiments, from about 150 μm to about 200 μm. The height of the swellable pocket-forming agent can range from about 0.1 μm to about 200 μm or, in certain embodiments, from about 150 μm to about 200 μm. The length and/or breadth and/or depth(height) of the swellable pockets can range from about 0.1 μm to about 200 μm with an average dimension/diameter of about 150 Micropores can be through pores and can range from about 500 nm to about 10 μm.

Figure 2A:
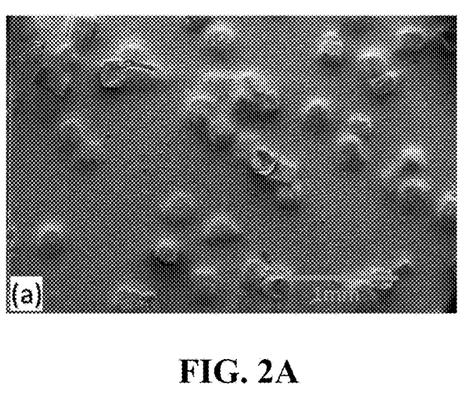
FIGS. 2A-2B depict SEM images of polyethylene thin films with swellable pockets and micropores.
Figure 2B:
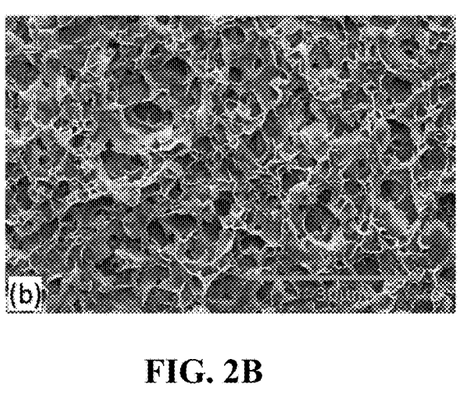

In FIGS. 2A-2B, the porous thin film made of polyethylene with prefilled swellable pockets was prepared through spin coating. The peeled layer was washed in water to achieve empty swellable pockets.

Figure 3A:
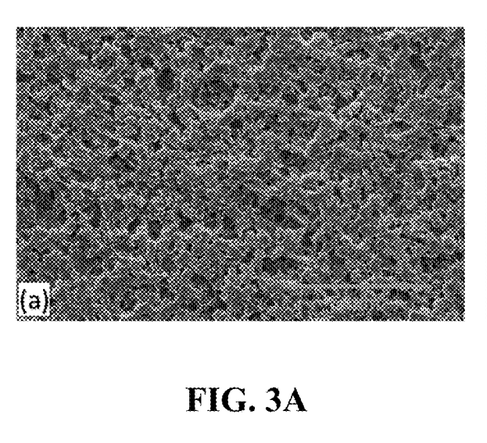
FIGS. 3A-3B depict SEM images of polyethylene thin film before (FIG. 3A) and after (FIG. 3B) heating.
Figure 3B:
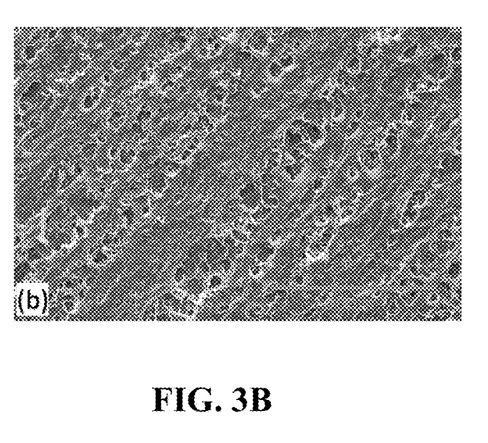

In FIGS. 3A-3B, a spin coating technique was used to prepare polyethylene thin films. Before post-heating, the structure of the polyethylene resembles flakes or petal-like structures. They are more porous but less strong. They cannot be reused as the tensile strength of these thin films is weak. They cannot be peeled-off easily. Upon heating the polyethylene molecules, the molecules become soft and form more intermolecular bonding between the polymer chains, resulting in a strong thin film. The heated thin film in FIG. 3B shows a porous structure with improved strength.

Figure 4A:
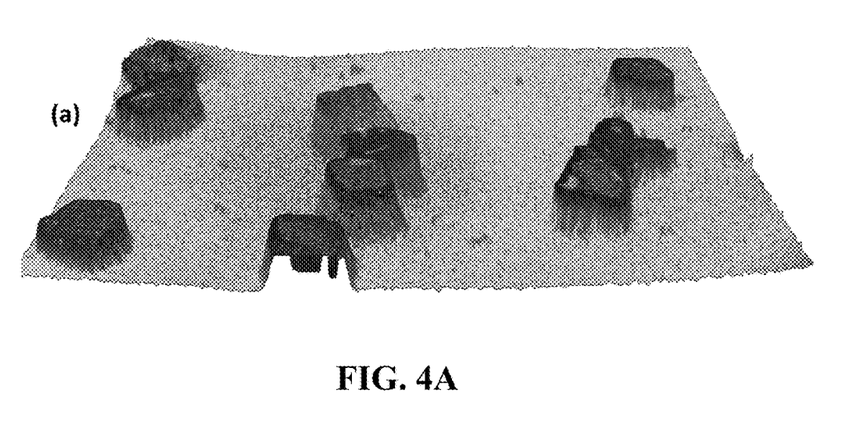
FIGS. 4A-4B depict 3D images of the porous thin film polymer showing micropores and swellable pockets using a profilometer. The porous thin film shows swellable pockets from the top surface (FIG. 4A) and the bottom surface (FIG. 4B)
Figure 4B:
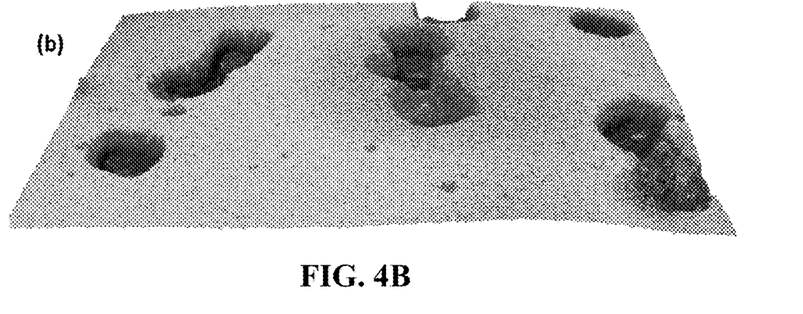

In FIGS. 4A-4B, the porous thin film made of polyethylene with prefilled swellable pockets was prepared through spin coating. The peeled layer was washed in water to remove salt and to achieve empty swellable pockets.

Figure 5:
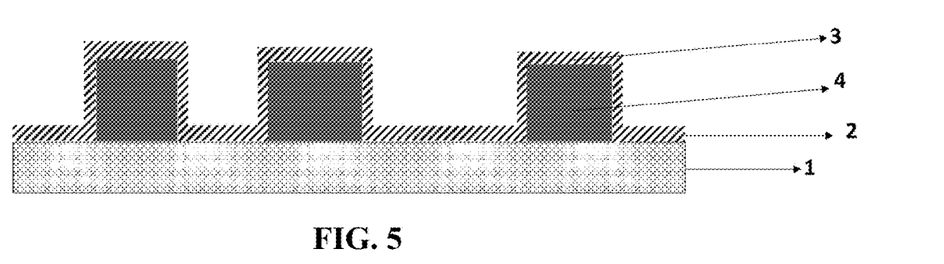
FIG. 5 is a schematic representation of a cross-sectional view of the porous thin film 2 with swellable pockets before peeling off from the substrate 1.

In FIG. 5, a porous thin film 2 made of polyolefin was prepared using the spin coating technique. The porous thin film 2 with prefilled swellable pockets 3 with swellable pocket forming agent 4 rests on a substrate 1. The porous thin film 2 on the substrate 1 prepared using the spin coating method with swellable pocket forming agent 4 is not yet peeled off. The solid substrate 1 can be a glass surface or metal surface. The glass substrate 1 is heated to a temperature ranging from about 130° C. to about 150° C. or a temperature up to the melting point of the polymer. After heating, the thin film 2 can be peeled off using a tweezer resulting in a freestanding thin film and can be independently held without any other support either on complex support or individual microporous support.

Figure 6:
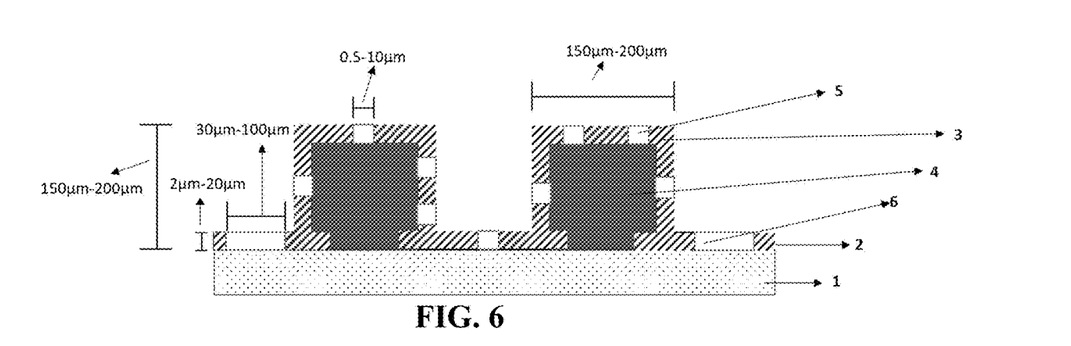
FIG. 6 is a schematic representation of a cross-sectional view of a porous thin film 2 with micropores 5, macro-voids 6, and prefilled swellable pockets 3 with swellable pocket forming agent 4 on a solid substrate 1.

In FIG. 6, a porous thin film made of polyolefin was prepared using the spin coating technique. The porous thin film 2 with prefilled swellable pockets 3 with swellable pocket forming agent 4 resting on a substrate 1 has a thickness ranging between about 2 μm and about 100 μm or, in certain embodiments, between about 2 μm and about 20 μm. Micropores 5 can be through pores and can range between about 0.5 μm and about 10 μm or, in certain embodiments, between about 500 nm and about 5 μm. Macro-voids 6 are through pores and can range between about 10 μm and about 200 μm, or above, or in certain embodiments, between about 30 μm and about 100 μm. These macro-voids can be formed near the swellable pockets. They can be formed when the initial spin coat speed is high (above 600 rpm). If macro-voids are not desired, then the initial speed of the spin coat should be below about 500 rpm.

Figure 7:
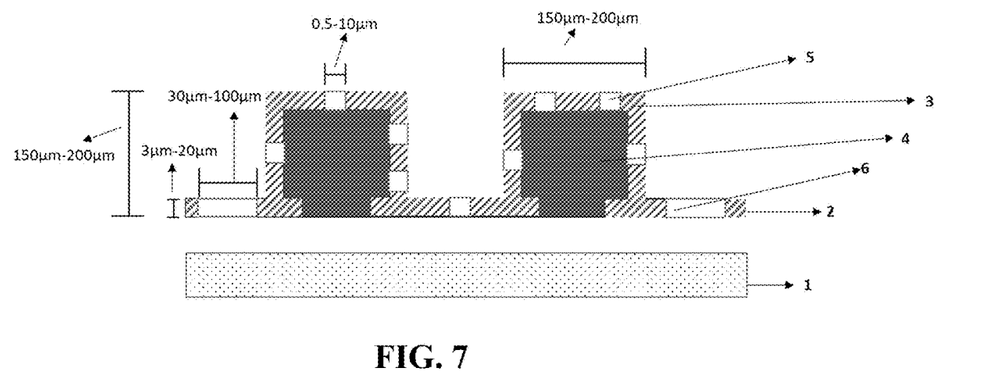
FIG. 7 is a schematic representation of a cross-sectional view of a freestanding porous thin film 2 with micropores 5, macro-voids 6, and prefilled swellable pockets 3 with swellable pocket forming agent 4 separated from the solid substrate 1.

In FIG. 7, a porous thin film made of polyolefin was prepared using the spin coating technique. The porous thin film 2 with prefilled swellable pockets 3 with swellable pocket forming agent 4 can be separated from a substrate 1. The thickness of the thin film 2 can range between about 2 μm and about 100 μm or, in certain embodiments, between about 2 μm and about 20 μm.

Figure 8:
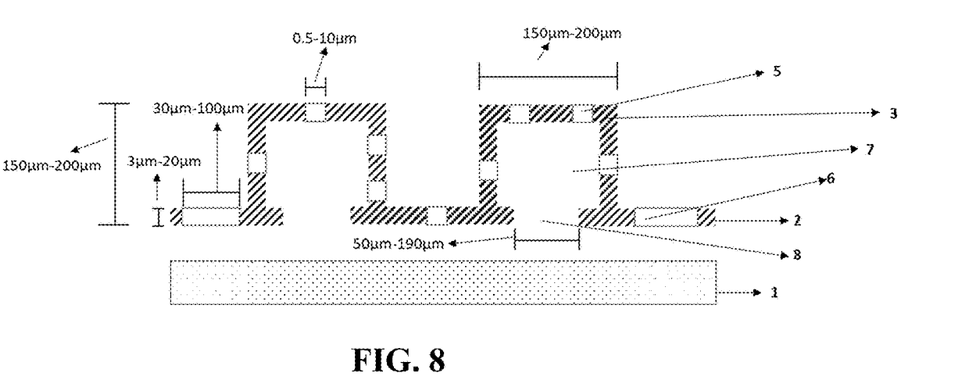
FIG. 8 is a schematic representation of a cross-sectional view of a freestanding porous thin film 2 with micropores 5, macro-voids 6, and empty swellable pockets 7 with no swellable pocket forming agents.

In FIG. 8, a porous thin film 2 made of polyolefin was prepared using the spin coating technique. The porous thin film 2 with empty swellable pockets 7 was prepared through spin coating. The peeled layer was washed in water to achieve a thin film with empty swellable pockets.

Figure 9A:
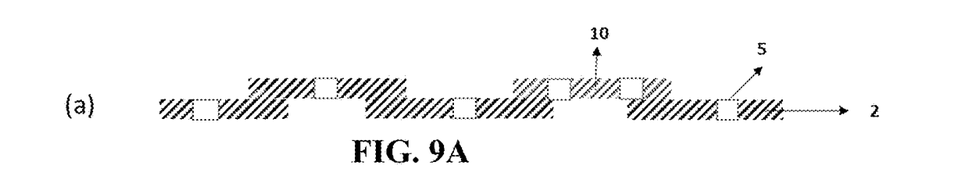
FIGS. 9A-9C are schematic representations of a porous thin film 2 with sponge-like swellable pockets in compressed form (FIG. 9A), after oil sorption (FIG. 9B), and after squeezing (FIG. 9C).
Figure 9B:
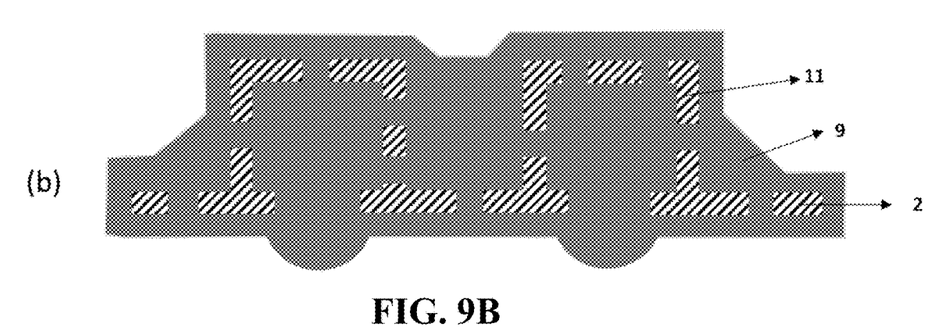
Figure 9C:
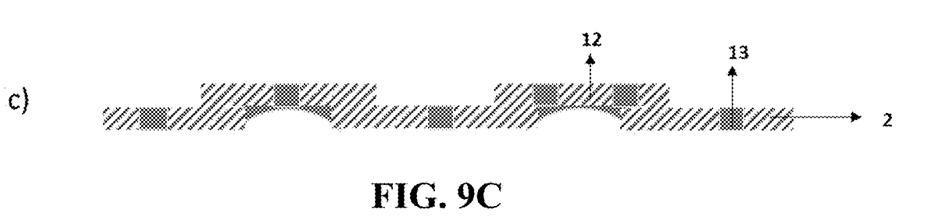

In FIG. 9A, the thin film 2 is in a packed state with compressed swellable pockets 10. Once it is put in oil, the micropores 5, compressed swellable pockets 10 can absorb oil 9 and expand to its maximum capacity and retain good volume of oil represented as swollen swellable pockets 11 as shown in FIG. 9B. When the oiled film is pressed or squeezed, the oil inside the swellable pockets 12 can be extracted and very minute amount of oil can be present inside the micropores 13 as shown in FIG. 9C. This film can be packed in a compressed form to occupy more films in a limited space. Further, this film can be reused for oil sorption for many a times without losing the structural integrity and structure collapse.

Figure 10:
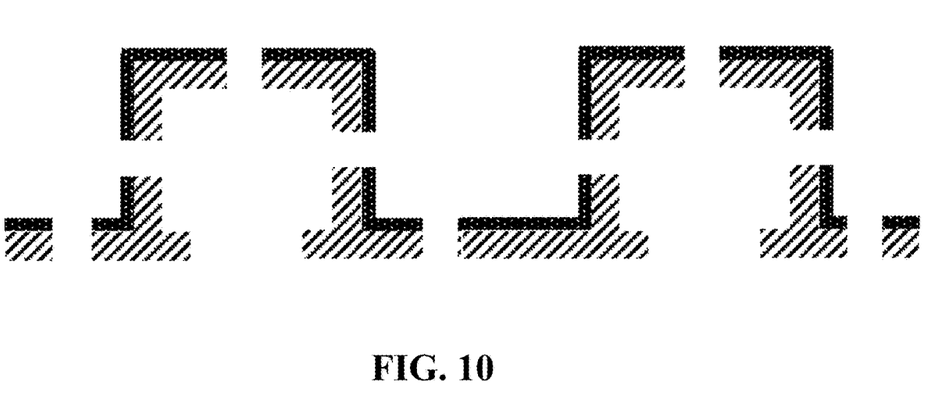
FIG. 10 is a schematic representation of a thin film with swellable pocket laminated with a superhydrophobic coating.

In FIG. 10, the thin film 2 with swellable pockets is laminated with a nano hydrophobic layer 9 to make the thin film super oleophilic or superhydrophobic. The lamination or coating can be done with a chemical vaporization technique or physical vaporization technique. The thin film can be laminated with functionalization of any composition of interest as required for the application.

Figure 11:
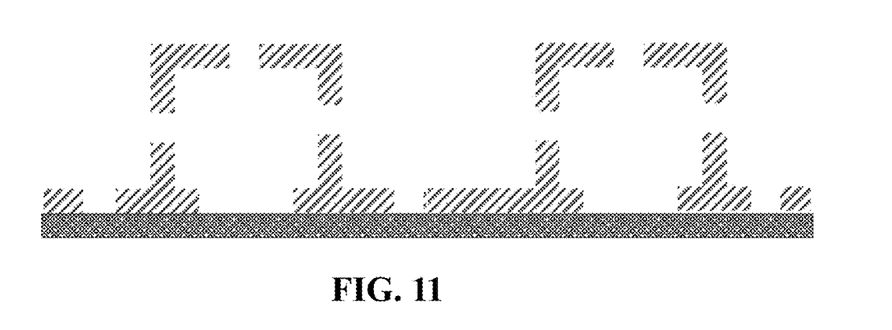
FIG. 11 is a schematic representation of thin film swellable pockets supported on a polypropylene support.

In FIG. 11, a thin film is rested on a support made of nonwoven thin polypropylene fabric. This support enhances the strength, durability and recyclability. The pores of the nonwoven fabric is more than 1 mm, thus it does not block the properties of the thin film applications.

Figure 12:
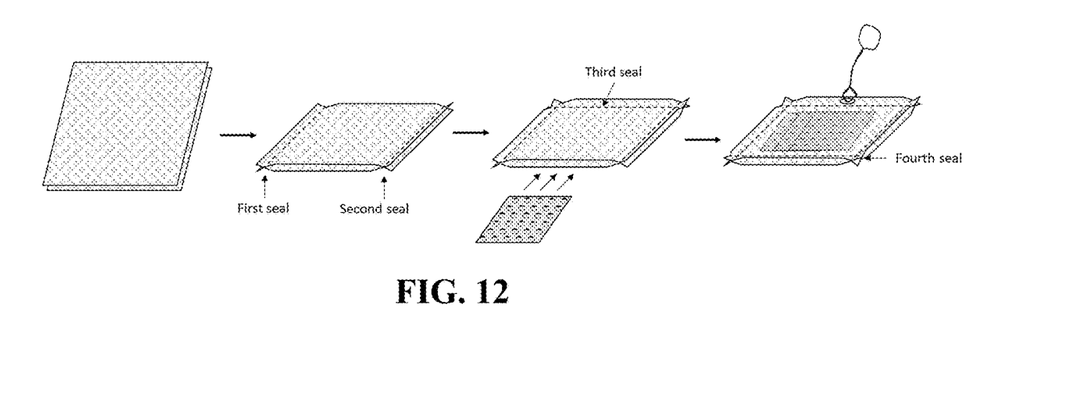
FIG. 12 is a schematic representation of the steps of sealing of thin films into pouches.

In FIG. 12, a pouch is made of nonwoven polypropylene fabric which is heat sealed on three sides. Two or more porous thin films can be inserted into the pouch from the open side. After inserting the thin films, the pouch can be heat-sealed from the fourth side, connected to a thread which can be knotted and transformed into a bag. Then this bag can be easily used and dipped into the oil and later, oil can be squeezed to remove the oil and recycled. The bag can also be used for organics sorption from water.

EXAMPLES

Example 1

Preparation of HDPE Thin Film 3 g of HDPE is taken in a round-bottomed flask. 50 ml of p-xylene is added to the round-bottomed flask and allowed to stir. The reaction mixture is heated at 130° C. until a clear solution is achieved. Usually, the polymer is dissolved in 10-15 minutes. The round-bottomed flask is connected to a reflux condenser to avoid organic solvent loss. Add 6 g of sodium chloride size ranging between 150 μm and 200 μm. Allow the polymer reaction mixture to stir until a uniform dispersed solution is achieved.

Simultaneously, a plain glass plate of size 5 cm×5 cm is heated to 120° C. Then it is placed on a customized spin coater chuck and the polymer reaction mixture is poured onto a hot glass surface and a lid of the spin coater chuck is closed to avoid organic solvent evaporation and exposure. The spin coater chuck is turned on and allowed to spin in three steps. A first step includes spinning at 600 rpm for 5 seconds, followed by a second step including spinning at 1000 rpm for 60 seconds, and a third step including spinning at 3000 rpm for 120 seconds. After the completion of spin coating, a white powdered layer is observed with no solvent in it. The solid substrate is removed from the spin coater chuck and placed in a hot air oven for 20 minutes at 130° C. Then the thin film is peeled off easily using a tweezer.

The thin film is then washed in water for 5 minutes to remove the swellable pocket forming agent, sodium chloride, to obtain a macro-porous thin film layer. It is noted that a reaction hotplate-stirrer and the spin coater chuck are placed side-by-side to avoid solvent exposure to the environment. The whole setup is kept inside a fume hood. The spin coater drain is connected to a receiver. The thickness for the thin film achieved through this composition is 7 μm. The strength obtained for this film is 4 MPa. The 3D images by profilometry shown in FIG. 4 are of this example. All the properties of this thin film are presented in Table 1, Example 2, which is further explained in Table 2. The SEM images shown in FIGS. 1-3 were prepared through this combination.

TABLE 1

Tensile Strength comparison for different compositions of polyolefins and swellable pocket forming agents at optimized conditions.

| Sample Example | composition Polymer in Xylene [mg/ml] | Polymer to swellable pocket forming agent (NaCl) ratio (w/w %) | Thickness (μm) | Tensile Strength (MPa) | Swellable pockets |
|---|---|---|---|---|---|
| 1 | HDPE [60 mg/ml] | 1:0 | 7 | 5 | Absent |
| 2 | HDPE [60 mg/ml] | 1:2 | 7 | 4 | Present |
| 3 | HDPE:UHMWPE (85:15) [30 mg/ml] | 1:0 | 7 | 15 | Absent |
| 4 | HDPE:UHMWPE (85:15) [30 mg/ml] | 1:1 | 7 | 12 | Present |
| 5 | HDPE:UHMWPE (85:15) [30 mg/ml] | 1:2 | 7 | 10 | Present |

TABLE 2

Porosity vs Strength comparison for HD porous thin film with swellable pockets (polymer: swellable pocket forming agent-1:2) (Example 2 in Table 1)

| SN | Porosity % | [1]Thickness (μm) | [2]Temperature ° C. | Time min | Strength MPA |
|---|---|---|---|---|---|
| 1 | ~75 | 20 | 25 | 0 | [3]ND |
| 2 | ~71 | 18 | 130 | 5 | ND |
| 3 | ~66 | 16 | 130 | 10 | 1 |
| 4 | ~60 | 14 | 130 | 15 | 2 |
| 5 | ~30* | 7 | 130 | 20 | 4 |
| 6 | ~7 | 5 | 130 | 25 | 6 |
| 7 | <1 | 5 | 135 | 5 | 6 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 μm to 2 μm.

Example 2

Preparation of HDPE:UHMWPE Thin Film

UHMWPE can be added to strengthen the sorbent. 1.275 g of HDPE and 0.225 g of UHMWPE are taken in a round-bottomed flask. 50 ml of isomeric mixture of xylenes is added to the round-bottomed flask and allowed to stir. The reaction mixture is heated at 130° C. until a clear solution is achieved. Usually, the polymer is dissolved in 10-15 minutes. The round-bottomed flask is connected to a reflux condenser to avoid organic solvent loss. Add 3 g of sodium chloride size ranging between 150 μm and 200 μm. Allow the polymer reaction mixture to stir until a uniform dispersed solution is achieved.

Simultaneously, a plain glass plate of size 5 cm×5 cm is heated to 120° C. Then it is placed on the customized spin coater chuck and the polymer reaction mixture is poured onto the hot solid surface and the lid of the spin coater is closed to avoid solvent evaporation and exposure. The spin coater is turned on and allowed to spin in three steps. The first step includes spinning at 600 rpm for 5 seconds, followed by the second step including spinning at 1000 rpm for 60 seconds, and the third step including spinning at 3000 rpm for 120 seconds. After the completion of spin coating, a white powdered layer is observed with no solvent in it. The solid substrate is removed from the chuck and placed in a hot air oven for 20 minutes at 130° C. Then the thin film is peeled off easily using a tweezer.

Wash the film in water for 5 minutes to remove the swellable pocket forming agent, sodium chloride, to obtain a macro-porous thin film layer. The reaction hotplate-stirrer and spin coater are placed side-by-side to avoid solvent exposure to the environment. The whole setup is kept inside the fume hood. The spin coater drain is connected to a receiver and excess polymer and xylene is collected. The thickness for the thin film achieved through this composition is 7 µm. The strength obtained for this film is 10 MPa. HDPE and UHMWPE were taken according to the above formulation and thin films on a glass substrate were prepared. All the properties of this thin film are presented in Table 1, Example 5, which is further explained in Table 3.

TABLE 3

Porosity vs Strength comparison for HDPE-UHMWPE porous thin film with swellable pockets (polymer: swellable pocket forming agent-1:2) (Example 5 in Table 1)

| SN | Porosity % | [1]Thickness (µm) | [2]Temperature ° C. | Time min | Strength MPA |
|---|---|---|---|---|---|
| 1 | ~75 | 20 | 25 | 0 | [3]ND |
| 2 | ~71 | 18 | 130 | 5 | ND |
| 3 | ~66 | 16 | 130 | 10 | 1 |
| 4 | ~60 | 14 | 130 | 15 | 2 |
| 5 | ~30* | 7 | 130 | 20 | 10 |
| 6 | ~7 | 5 | 130 | 25 | 12 |
| 7 | <1 | 5 | 135 | 5 | 13 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 µm to 2 µm.

Example 3

UHMWPE Usage

UHMWPE (ultra-high molecular weight polyethylene) is added to strengthen the thin films. When it is added at 15 wt %, the strength is enhanced by three times. As UHMWPE is a PE, it does not create a compatibility problem when used with HDPE or other PEs. Instead, on the addition of UHMWPE, the viscosity of the solution is increased. Example 3-5 in Table 1 and Tables 3 to 10 reflect the results using UHMWPE.

TABLE 4

Porosity vs Strength comparison for HDPE-UHMWPE porous thin film with no swellable pockets (polymer: swellable pocket forming agent-1:0) (Example 3 in Table 1)

| SN | Porosity % | [1]Thickness (µm) | [2]Temperature ° C. | Time min | Strength MPA |
|---|---|---|---|---|---|
| 1 | ~75 | 20 | 25 | 0 | [3]ND |
| 2 | ~71 | 18 | 130 | 5 | ND |
| 3 | ~66 | 16 | 130 | 10 | 1 |
| 4 | ~60 | 14 | 130 | 15 | 5 |
| 5 | ~30* | 7 | 130 | 20 | 15 |

TABLE 4-continued

Porosity vs Strength comparison for HDPE-UHMWPE porous thin film with no swellable pockets (polymer: swellable pocket forming agent-1:0) (Example 3 in Table 1)

| SN | Porosity % | [1]Thickness (µm) | [2]Temperature ° C. | Time min | Strength MPA |
|---|---|---|---|---|---|
| 6 | ~7 | 5 | 130 | 25 | 26 |
| 7 | <1 | 5 | 135 | 5 | 27 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 µm to 2 µm.

TABLE 5

Porosity vs Strength comparison for HDPE-UHMWPE porous thin film with swellable pockets (polymer: swellable pocket forming agent-1:1) (Example 4 in Table 1)

| SN | Porosity % | [1]Thickness (µm) | [2]Temperature ° C. | Time min | Strength MPA |
|---|---|---|---|---|---|
| 1 | ~75 | 20 | 25 | 0 | [3]ND |
| 2 | ~71 | 18 | 130 | 5 | 1 |
| 3 | ~66 | 16 | 130 | 10 | 2 |
| 4 | ~60 | 14 | 130 | 15 | 6 |
| 5 | ~30* | 7 | 130 | 20 | 12 |
| 6 | ~7 | 5 | 130 | 25 | 14 |
| 7 | <1 | 5 | 135 | 5 | 16 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 µm to 2 µm

TABLE 6

Retention capacity of Example 5 (HDPE-UHMWPE) thin film using engine oil.

| S.N. | Dripping time (min) | Oil uptake capacity[1] (g/g) |
|---|---|---|
| 1 | 0 | 160 |
| 2 | 0.5 | 130 |
| 3 | 1 | 110 |
| 4 | 2 | 108 |
| 5 | 5 | 105 |
| 6 | 15 | 105 |

[1]Oil uptake capacity with an error of ±10%

TABLE 7

Saturation capacity profile of Example 5 (HDPE-UHMWPE) thin film using engine oil

| S.N. | Saturation time (min) | Oil uptake capacity* (g/g) | Oil uptake capacity** (g/g) |
|---|---|---|---|
| 1 | 0.5 | 70 | 55 |
| 2 | 1 | 110 | 80 |
| 3 | 2 | 160 | 105 |
| 4 | 5 | 160 | 105 |
| 5 | 15 | 160 | 105 |

*Oil uptake measured immediately after taking out the film from an oil bath
**Oil uptake measured after equilibrium is reached (after dripping for 5 mins)

TABLE 8

Comparison of oil uptake capacity[1] using Example 5 sorbent with commercial sorbents using engine oil.

| S.N. | Sorbent (g/g) | 3M HP-255 (g/g) | Chemtex BP9W (g/g) |
|---|---|---|---|
| 1* | 160 | 27 | 22 |
| 2** | 105 | 23 | 17 |

[1]Oil uptake capacity with an error of ±10%
*Oil uptake measured immediately after taking out the film from an oil bath
**Oil uptake measured after equilibrium is reached (after dripping for 5 mins)

TABLE 9

Comparison with different oils and liquids using Example 5 sorbent.

| Oil | Uptake capacity (g/g)[1] | Uptake capacity (g/g)[2] |
|---|---|---|
| Toluene | 40 | 25 |
| Sunflower Oil | 110 | 65 |
| Paraffin Oil | 90 | 45 |
| Synthetic Oil | 130 | 85 |
| Engine Oil | 160 | 105 |

[1]uptake capacity immediately after oil sorption;
[2]uptake capacity after 5 minutes dripping.

TABLE 10

Oil water separation efficiency using Example 5 sorbent.

| SN | Oil in water (ppm) | Efficiency % |
|---|---|---|
| 1 | 1000 | 40 |
| 2 | 800 | 50 |
| 3 | 600 | 66 |
| 4 | 500 | 80 |
| 5 | 400 | 100 |
| 6 | 200 | 100 |
| 7 | 100 | 100 |
| 8 | 1 | 100 |

Example 4

Oil Sorption Studies

The oil sorption studies including dripping kinetics and saturation kinetics and comparison with commercial sorbents as shown in Table 6, 7, and 8 respectively were done using the Example 5. Then these thin films were subjected to post-heat at varying temperatures. We have measured tensile strength and porosity for these samples that can be used as freestanding thin films. These values are mentioned in Tables 1-6.

TABLE 11

Porosity vs Strength comparison for HD porous thin film with no swellable pockets (polymer: swellable pocket forming agent-1:0) (Example 1 in Table 1)

| SN | Porosity % | [1]Thickness (μm) | [2]Temperature ° C. | Time min | Strength MPA |
|---|---|---|---|---|---|
| 1 | ~75 | 20 | 25 | 0 | [3]ND |
| 2 | ~71 | 18 | 130 | 5 | ND |
| 3 | ~66 | 16 | 130 | 10 | 1 |
| 4 | ~60 | 14 | 130 | 15 | 2 |
| 5 | ~30* | 7 | 130 | 20 | 5 |
| 6 | ~7 | 5 | 130 | 25 | 9 |
| 7 | <1 | 5 | 135 | 5 | 10 |

[1]initial weight of the thin film was 7 mg.
[2]Temperature should be close to the melting point of the polymer. For HD, Temp is 130° C.
[3]Not determined-the polymer is in the form of petals or flakes and cannot be considered as a freestanding thin film,
*Pore size ranges from 0.5 μm to 2 μm.

Dripping kinetics is the amount of oil dripped from the thin film with respect to time. When a thin film is placed or dipped in oil, it absorbs oil till it reaches saturation. After it reaches equilibrium, the thin film is taken out and loosely connected oil is allowed to drain from it. Initially, oil will drip more and as time passes, the dripping decreases, and after some time some oil is retain by the film and oil is not dripped. This is termed as retention capacity of the thin film. The as-prepared thin film sorbent reaches its equilibrium uptake value after 5 minutes of dripping (i.e., after 5 minutes there will be no more dripping of oil from the sorbent).

Saturation kinetics is the time taken by the thin film to reach a saturation point, whereafter the oil cannot be absorbed anymore. In short, it is the maximum capacity of the oil absorbed by the thin film with respect to time. The as-prepared thin film sorbent reaches its saturation value within 5 minutes of sorption. Comparison of the present as-prepared oil sorbent film with commercial sorbents was conducted. An area of 16 cm$^2$ of 3 M and Chemtex commercial sorbents were cut and were compared with an area of 16 cm$^2$ size of thin film as shown in Table 8. The equilibrium oil uptake value of the present porous sorbent was found to be 90 g/g, which is much higher than the commercial sorbent pads made of nonwoven polypropylene fabric. Lastly, different oil and organic solvents were used to measure the uptake capacity of the present sorbent and reported in Table 9.

Example 5

Separation Efficiency

The sorbent film of 16 cm$^2$ and a thickness of 7 μm was used to measure oil water separation efficiency. Initially, the film was installed on a sintered glass filtration unit and a solution of 1000 ppm oil suspended in water was allowed to pass through the filtration unit. The results, reported in Table 10, were of Example 5. The film had a 100% oil water separation efficiency with a maximum capacity of 400 ppm per cm$^2$ of sorbent film.

It is to be understood that the present processes, compositions, and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing a freestanding porous polyethylene thin film, the method comprising:
   dissolving polyethylene in an organic solvent to form a solution under reflux conditions;
   adding a swellable pocket forming agent to the solution and mixing the solution until the swellable pocket forming agent is well-dispersed therein, thereby forming a well-dispersed solution;
   placing a solid substrate onto a spin coater chuck;
   applying the well-dispersed solution onto the solid substrate through spin coating to form a thin film on the solid substrate;
   collecting excess materials of the polyethylene and the organic solvent in a spin coated drain connected to a receiver;
   removing the solid substrate with the thin film formed thereon from the spin coater chuck;
   subjecting the formed thin film to post-heat;
   peeling the thin film off the solid substrate to obtain a peeled thin film; and
   extracting the swellable pocket forming agent from the peeled thin film by washing the peeled thin film in water, thereby obtaining a freestanding porous polyethylene thin film with swellable pockets, macro-voids, and micropores, wherein each of the swellable pockets are configured to swell twenty to thirty times a thickness of the freestanding porous polyethylene thin film when in contact with oil.

2. The method for preparing a freestanding porous polyethylene thin film of claim 1, wherein the organic solvent is selected from the group consisting of p-xylene and an isomeric mixture of xylenes.

3. The method for preparing a freestanding porous polyethylene thin film of claim 1, wherein the dissolving polyethylene step comprises dissolving the polyethylene and the organic solvent in a round-bottomed flask and connecting the round-bottomed flask to a reflux condenser to avoid loss of the organic solvent.

4. The method for preparing a freestanding porous polyethylene thin film of claim 1, wherein the swellable pocket forming agent is selected from the group consisting of sodium chloride, mica, alumina, barium sulfate, barium carbonate, calcium sulfate, calcium oxide, calcium carbonate, diatomaceous earth, clay, talc, glass powder, kaolin, magnesium oxide, magnesium sulfate, magnesium carbonate, silica clay, silica, titanium oxide, zinc oxide, potassium chloride, calcium chloride, and a combination thereof; and wherein a size of the swellable pocket forming agent ranges from about 3 μm to about 200 μm.

5. The method for preparing a freestanding porous polyethylene thin film of claim 1, wherein the solid substrate is selected from the group consisting of glass and metal.

6. The method for preparing a freestanding porous polyethylene thin film of claim 1, wherein the freestanding porous polyethylene thin film is made of a virgin or recycled material selected from the group consisting of LDPE (low-density polyethylene), LLDPE (linear low-density polyethylene), HDPE (high-density polyethylene), UHMWPE (ultrahigh molecular weight polyethylene), and a combination thereof.

7. The method for preparing a freestanding porous polyethylene thin film of claim 1, wherein the subjecting of the formed thin film to the post-heat occurs for about 5 seconds to about 25 minutes and is conducted at a temperature of about 25° C. to about 150° C.

8. The method for preparing a freestanding porous polyethylene thin film of claim 1, wherein the swellable pocket forming agent is added to the solution in a ratio of the polyethylene to the swellable pocket forming agent of about 1:0 w/w % to about 1:2 w/w %.

9. The method for preparing a freestanding porous polyethylene thin film of claim 1, wherein the macro-voids are formed by conducting the spin coating at a speed above about 600 rpm to obtain macro-void dimensions of between about 10 μm and about 200 μm.

10. The method for preparing a freestanding porous polyethylene thin film of claim 1, wherein the freestanding porous polyethylene thin film is self-supporting, free of a support or a substrate or a wall surface.

11. The method for preparing a freestanding porous polyethylene thin film of claim 1, further comprising laminating the freestanding porous polyethylene thin film with a layer of superhydrophobic coating using a chemical vaporization technique or a physical vaporization technique to make the freestanding porous polyethylene thin film superoleophilic or superhydrophobic.

12. The method for preparing a freestanding porous polyethylene thin film of claim 1, further comprising laminating the freestanding porous polyethylene thin film with a nonwoven thin polypropylene fabric made up of fibers to provide support and further enhance sorption capacity of the freestanding porous polyethylene thin film.

13. The method for preparing a freestanding porous polyethylene thin film of claim 1, wherein the freestanding porous polyethylene thin film is used as an oil sorbent.

14. The method for preparing a freestanding porous polyethylene thin film of claim 1, wherein the polyethylene comprises UHMWPE (ultrahigh molecular weight polyethylene) at 15 wt. % of the solution.

15. A freestanding porous polyethylene thin film prepared according to the method of claim 1, wherein the freestanding porous polyethylene thin film has about 500 to about 800 swellable pockets per $cm^2$, wherein each of the swellable pockets can swell twenty to thirty times a thickness of the freestanding porous polyethylene thin film when in contact with oil.

16. The freestanding porous polyethylene thin film of claim 15, having a thickness of about 2 μm to about 100 μm, a tensile strength of about 3 MPa to about 60 MPa, and a porosity ranging from about 1% to about 75%.

17. The freestanding porous polyethylene thin film of claim 15, wherein the swellable pockets, the macro-voids, and the micropores have dimensions of about 150 μm to about 200 μm, about 30 μm to about 100 μm, and about 0.5 μm to about 10 μm, respectively.

18. The freestanding porous polyethylene thin film of claim 15, having an oil uptake capacity of about 70 g/g to about 160 g/g as measured immediately after taking out the freestanding porous polyethylene thin film from an oil bath.

* * * * *